United States Patent [19]
Ziegler et al.

[11] Patent Number: 5,647,662
[45] Date of Patent: Jul. 15, 1997

[54] APPARATUS FOR COOLING A LIGHT BEAM

[76] Inventors: Byron J. Ziegler, 11700 Metric Blvd. #1322; Richard S. Belliveau, 2209 W. Braker La., both of Austin, Tex. 78758

[21] Appl. No.: 550,251

[22] Filed: Oct. 6, 1995

[51] Int. Cl.[6] ................................................. F21V 29/00
[52] U.S. Cl. ..................... 362/294; 362/293; 362/373; 165/104.13; 165/104.21; 165/104.28
[58] Field of Search ........................... 362/293, 294, 362/373, 96, 101, 318, 267, 264, 310, 307, 311; 165/104.21, 104.22, 104.28, 104.31, 104.13, 900

[56] References Cited

U.S. PATENT DOCUMENTS

| | | | |
|---|---|---|---|
| 1,895,887 | 1/1933 | Lorenz | 362/294 |
| 2,943,534 | 7/1960 | Pierschel | 362/294 |
| 3,193,001 | 7/1965 | Meckler | 362/294 |
| 3,914,010 | 10/1975 | Zeller | 362/294 |
| 4,843,529 | 6/1989 | Izenour | 362/284 |
| 4,890,208 | 12/1989 | Izenour | 362/294 |
| 5,147,130 | 9/1992 | Watanuli | 165/104.32 |
| 5,282,121 | 1/1994 | Bornhorst et al. | 362/294 |
| 5,497,573 | 3/1996 | Stadjuhar | 362/373 |

*Primary Examiner*—Ira S. Lazarus
*Assistant Examiner*—Thomas M. Sember

[57] ABSTRACT

Apparatus for cooling a light beam used to project an image on a projection surface. The apparatus includes a light beam source and a gas cooling circuit. A cooling chamber is connected to conduct gas through the circuit. An image projection device is mounted in the chamber. The chamber has a thermally protected environment. A driving device is provided in the circuit. A heat conducting gas is moved by the driving device to circulate within the circuit. The thermally protected environment may include an atmosphere of atomized, heat conducting fluid. A heat extracting filter may be mounted in the light beam adjacent the cooling chamber.

6 Claims, 6 Drawing Sheets

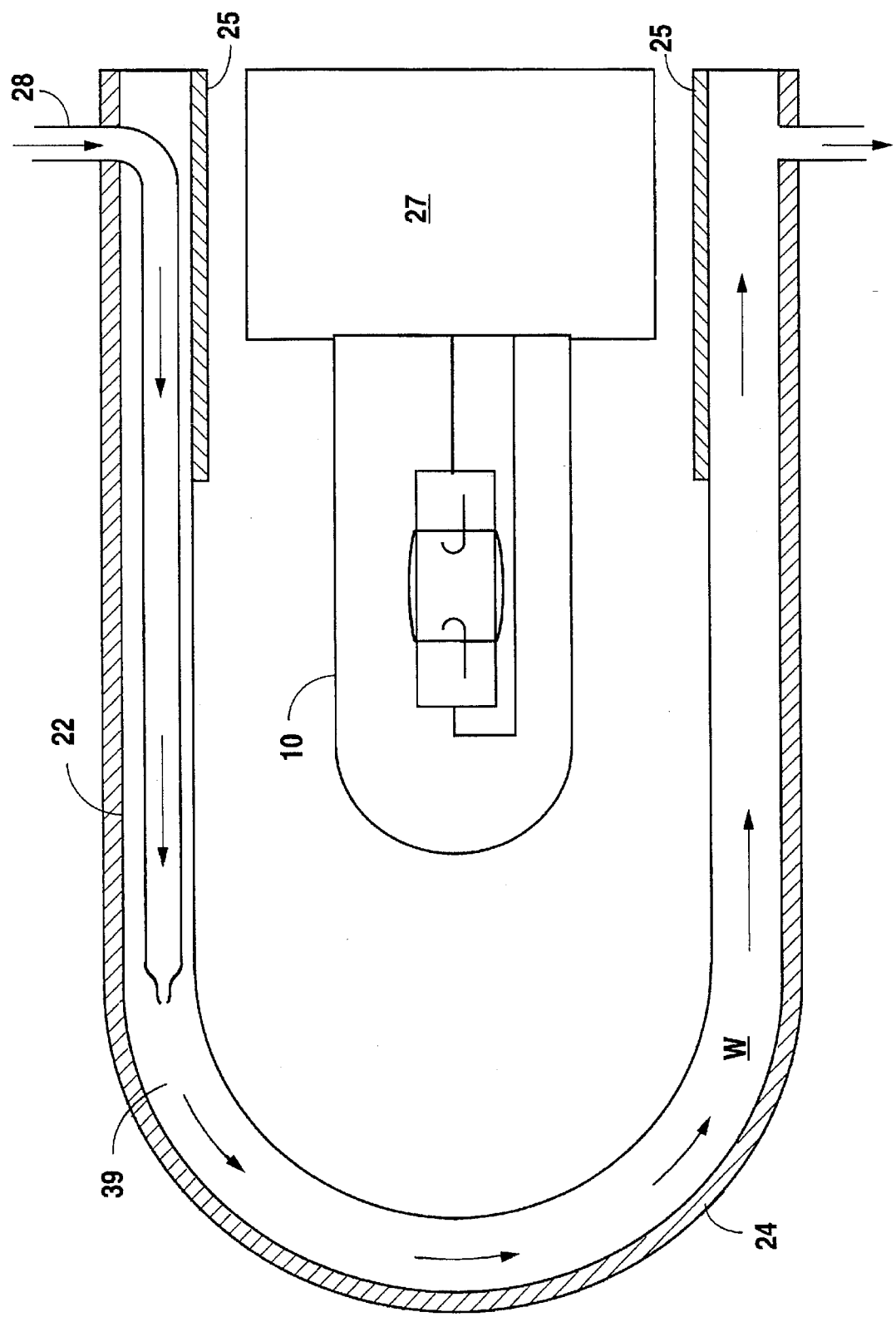

APPARATUS FOR COOLING A LIGHT BEAM

FIELD OF THE INVENTION

This invention relates generally to light beam projectors for stage, theater and studio use and more particularly to apparatus for cooling the light beam so that it does not damage an image producing device which has heat sensitive limitations.

BACKGROUND OF THE INVENTION

Various devices have been used in an attempt to provide a relatively cool light beam to limit some of the heat problems associated with lighting apparatus and in particular, in stage lighting apparatus. Most of the heat is generated from the infrared portion of the beam. One such attempt includes a reflector made of heat resistant glass coated on one side facing the lamp with a multi-layer dielectric film forming a "cold mirror". This device reflects visible light and allows heat rays to pass through the film.

In the past, a reflector such as that described above has been thermally connected to a heat sink. In this manner, rays directed at the reflector pass through the film and glass or other suitable substrate of the reflector and strike the heat sink which absorbs the rays as heat.

Another attempt utilizes a multi-layer dielectric interference filter, i.e. a dichroic "hot mirror" and a liquid cell placed in the light beam to remove energy, in the infrared region, from the beam. The hot mirror functions to reflect "near" infrared energy while passing light in other regions. The water in the liquid cell is effective in absorbing the "far" infrared energy that is not reflected by the dichroic filter.

This combination removes infrared radiation from the beam before it reaches, for example, a commonly used special effects apparatus such as an image projection device known as a gobo or an LCD. Although water is used in this liquid cell, hydrocarbons have also been used, i.e. glycol and water-glycol mixes. However, these liquids are limited by their tendency to chemically break down after prolonged use, thus changing color. This color change can interfere with the projected image.

The foregoing illustrates limitations of the know prior art. Thus it is apparent that it would be advantageous to provide an alternative directed to overcoming one or more of the limitations as set forth above. Accordingly, a suitable alternative is provided including features and benefits more fully disclosed hereinafter.

SUMMARY OF THE INVENTION

In one aspect of the present invention, this is accomplished by providing an apparatus for cooling a light beam comprising a light beam source, a gas cooling circuit, a cooling chamber connected to conduct a gas through the circuit, an image projecting device mounted in a chamber, the chamber having a thermally protected environment, a driving device and a heat conducting gas, the driving device being operable to move the heat conducting gas to circulate within the circuit.

The foregoing and other aspects will become apparent from the following detailed description of the invention when considered in conjunction with the accompanying drawing figures. It is to be expressly understood, however, that the figures are not intended as a definition of the invention, but are for the purpose of illustration only.

BRIEF DESCRIPTION OF THE DRAWING FIGURES

FIG. 4 is another diagrammatic view illustrating an embodiment of the cooled lamp of the present invention;

DETAILED DESCRIPTION OF THE INVENTION

Figure 1:
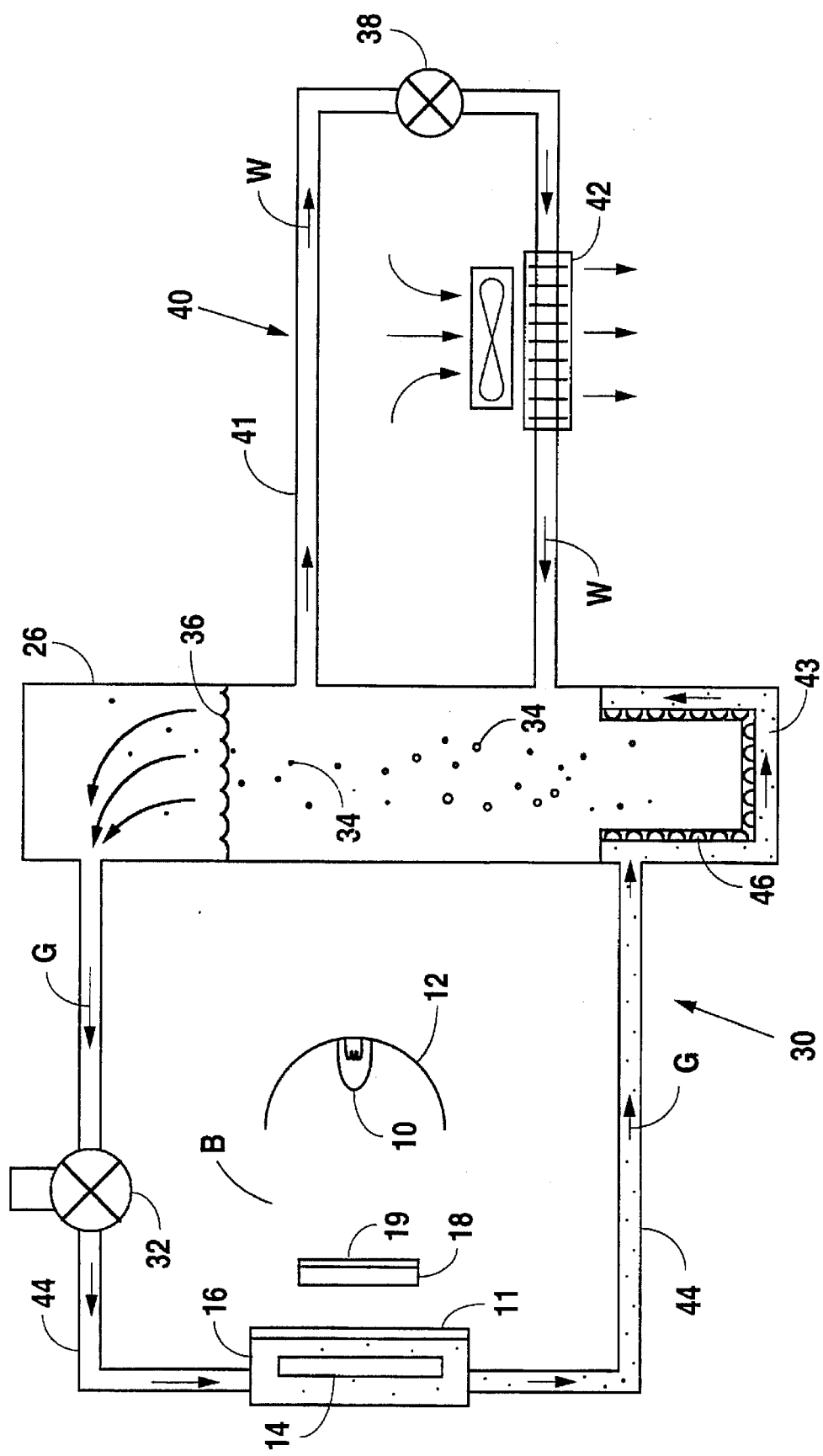
FIG. 1 is a diagrammatic view illustrating an embodiment of a system to be used in connection with the present invention.

The apparatus for cooling a light beam is illustrated in FIG. 1 in a system which includes a light beam source such as a lamp 10 having a reflector 12 for directing a beam of light, designated B, on an image projection device 14, such as an LCD or modified to utilize a digital micro-mirror device (DMD) suitably mounted in a cooling chamber 16. A well-known infrared filter 18 including a dichroic film 19 may be placed in the beam B to remove heat from the beam by reducing infrared, i.e. by reflecting near infrared while transmitting shorter wavelengths. Similarly, a suitable film 11 may be placed on a surface of chamber 16.

Figure 2:
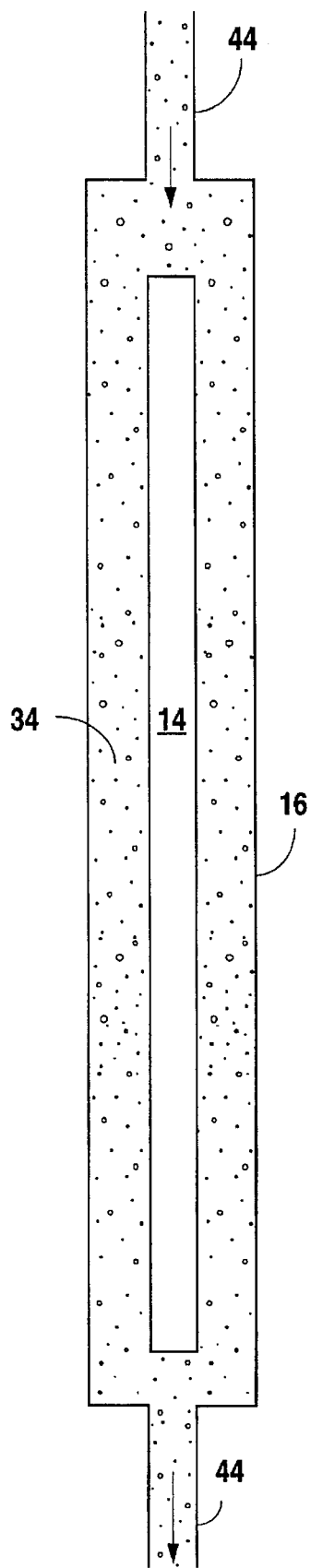
FIG. 2 is a diagrammatic view illustrating an embodiment of a cooling chamber of the present invention.

In the preferred embodiment of FIG. 1, the apparatus for cooling light beam B includes a closed loop cooling circuit 30. Cooling chamber 16 is connected to conduct a cooling fluid moving through circuit 30. Image projection device 14, is mounted in the chamber 16, see also FIG. 2. The chamber 16 has a thermally protected environment due to circulation of the cooling fluid such as a heat conducting gas, discussed below. A driving device 32, e.g. a compressor, such as a suitable, commercially available diaphragm type compressor, is operable to move the heat conducting gas 34, preferably Helium, to circulate within the circuit 30 in the direction of arrows designated G. Compressor 32 can be on either the upstream or downstream side of chamber 16, with respect to the movement of the Helium.

Cooling exchange tower 26 contains a supply of water 36. The water 36 is pumped by a suitable low pressure pump 38 through a conduit 41 of a water cooling circuit 40 across a heat exchanger 42 where heat is removed and the cooled water 36 is returned to tower 26 as indicated by the directional arrows designated W. At the same time, the Helium 34 is being moved through tower 26 by driving device 32. As the Helium 34 passes through tower 26, the Helium 34 is cooled by the water 36. To enhance cooling of the Helium 34, it is preferred to disperse as many Helium bubbles through the water as possible. This is accomplished by providing a plenum 43 which receives the Helium 34 from a conduit 44 of circuit 30 and releases the Helium 34 through the water 36 via several outlet jets 46 which disperse the Helium bubbles 34 through the water 36 with sufficient contact time to cool the Helium 34. The cooled Helium 34 is moved through conduit 44 from tower 26 and returned to the cooling chamber 16 where it extracts heat from the image projection device 14 thus providing a thermally protected environment for device 14 in chamber 16. The heated Helium 34 is then recirculated by compressor 32, and the cycle is repeated.

Figure 3:
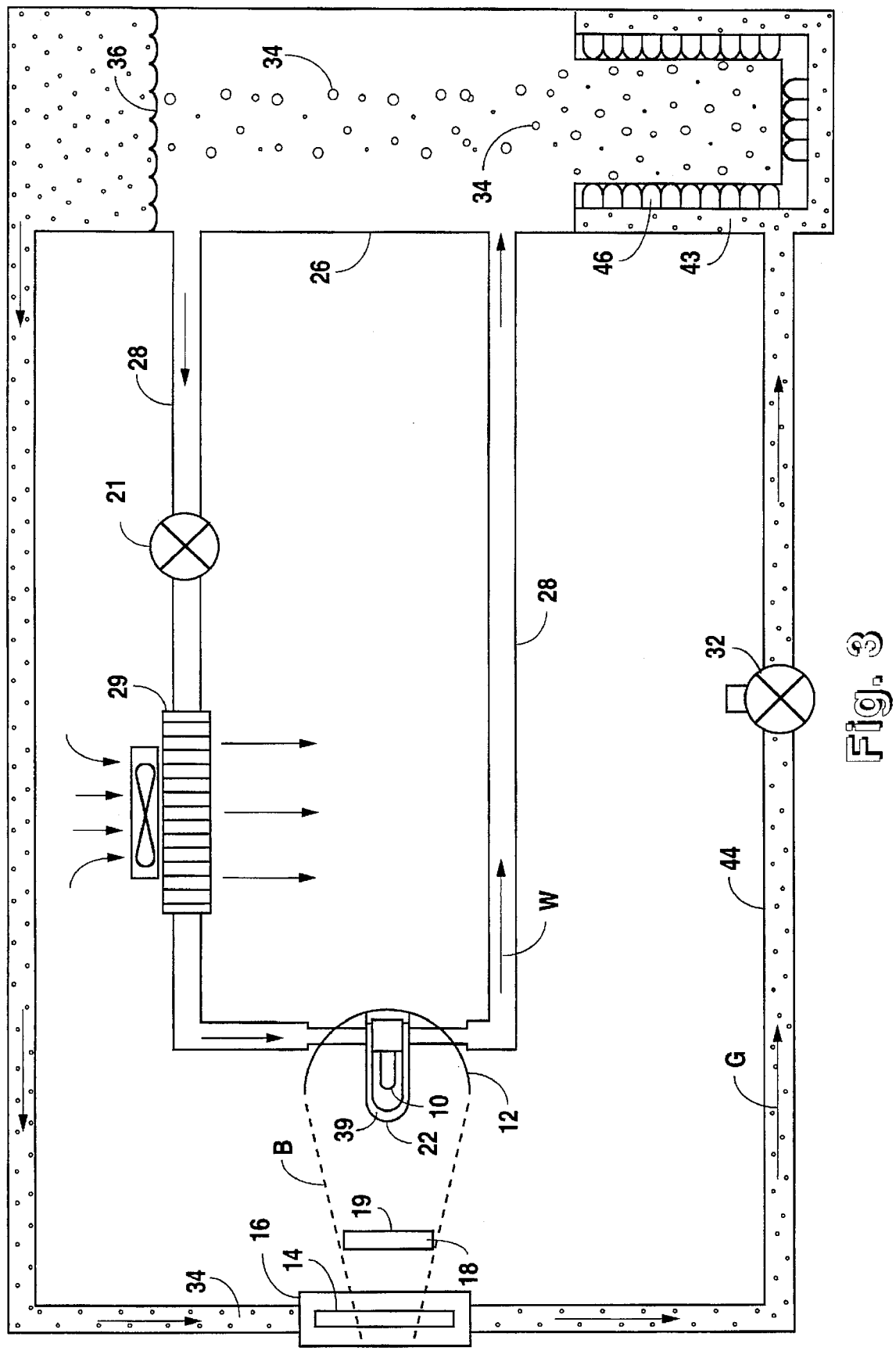
FIG. 3 is a diagrammatic view illustrating an embodiment of a cooled lamp of the present invention.

Alternatively, as shown in FIGS. 3 & 4, a water cooling device may be incorporated with lamp 10 to remove heat by a water circulation method, whereby water 36 from exchange tower 26 is circulated, as indicated by the directional arrows designated W, through a chamber 39 defined by a glass dome 22 adjacent lamp 10. Furthermore, a dichroic coating 24 similar to the film 19 used on filter 18, can be placed on a suitable surface of dome 22 for added heat reduction. This will function as a hot mirror reflecting "near" infrared into the water moving through chamber 39. Another coating 25 of dichroic film may be used on a suitable surface of dome 22 adjacent base 27 of lamp 10 to reflect visible light and pass infrared to be cooled by the water moving through chamber 39. Water circulated through dome 22 may be driven by a suitable low pressure pump 21 and conducted from cooling exchange tower 26 via a conduit 28 including a heat exchanger 29. The filter 18 and/or the dome 22 water circulation device can be used to cool beam B in combination with any of the embodiments described herein assuming suitable modifications are provided.

Figure 5:
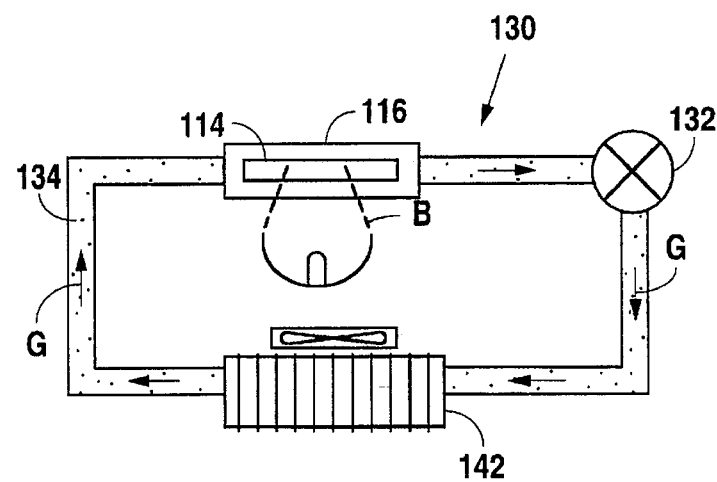
FIG. 5 is a diagrammatic view illustrating another embodiment of the present invention.

In another embodiment, as shown in FIG. 5, the apparatus for cooling a light beam B includes closed loop cooling circuit 130. Cooling chamber 116 is connected to conduct fluid moving through circuit 130. Image projection device 114, is mounted in chamber 116. The chamber 116 has a thermally protected environment due to circulation of a heat conducting gas 134 moving through circuit 130 as indicated by the directional arrows designated G. Compressor 132 is operable to move the heat conducting gas 134, which is preferably a fluorine containing refrigerant such as octafluoropropane ($C_3F_8$) in this embodiment, to be circulated within circuit 130, where heat exchanger 142 removes heat from the refrigerant 134 as the refrigerant circulates in circuit 130. The cooled refrigerant 134 is moved through circuit 130 from heat exchanger 142 and returned to cooling chamber 116 where it extracts heat from the image projection device 114 thus providing a thermally protected environment for device 114 in chamber 116. The heated refrigerant 134 is then recirculated by compressor 132, and the cycle is repeated.

Figure 6:
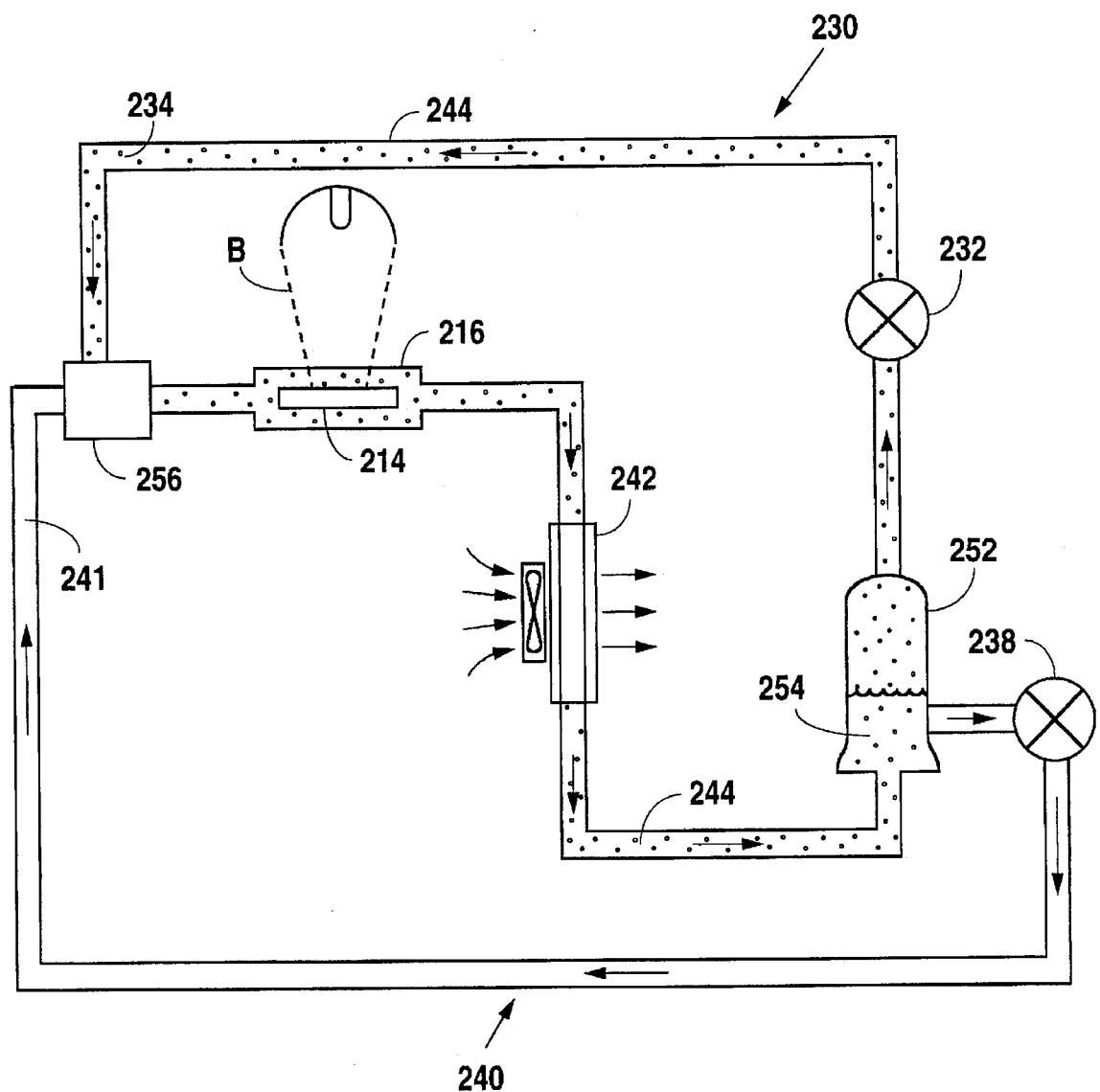
FIG. 6 is a diagrammatic view illustrating a further embodiment of the present invention.

The thermally protected environment in chamber 216, FIG. 6, includes an atmosphere of an atomized, heat conducting fluid. This is accomplished by an additional circuit 240, connected to circuit 230, and driven by a suitable low pressure liquid pump 238, a separation tower 252, containing a heat conducting fluid 254 such as water or alternatively, a fluorocarbon such as perfluorohexane ($C_6F_{14}$), and an aerosol generator 256, such as model number 646 Jet Nebulizer, manufactured by DeVilbiss. The aerosol generator 256 receives the compressor driven heat conducting gas, i.e. Helium 234, from conduit 244 and also receives the heat conducting fluid 254 from conduit 241 of circuit 240. The heat conducting fluid 254 is nebulized, i.e. atomized in the aerosol generator 256 and combines with the heat conducting gas 234 in the generator 256. This combination is conducted to the cooling chamber 216, assisted by a compressor 232, where it extracts heat from the image projection device 214. The heated combination is conducted via conduit 244 to a heat exchanger 242 where heat is removed. The cooled combination, i.e. Helium 234 and heat conducting fluid 254, is then conducted via conduit 244 to separation tower 252 where the heat conducting fluid 254 and Helium 234 separate, the heat conducting fluid 254 is pumped back to the aerosol generator 256 via conduit 241, the Helium 234 is compressed and returned to generator 256 via conduit 244 and the cycle is repeated.

Figure 7:
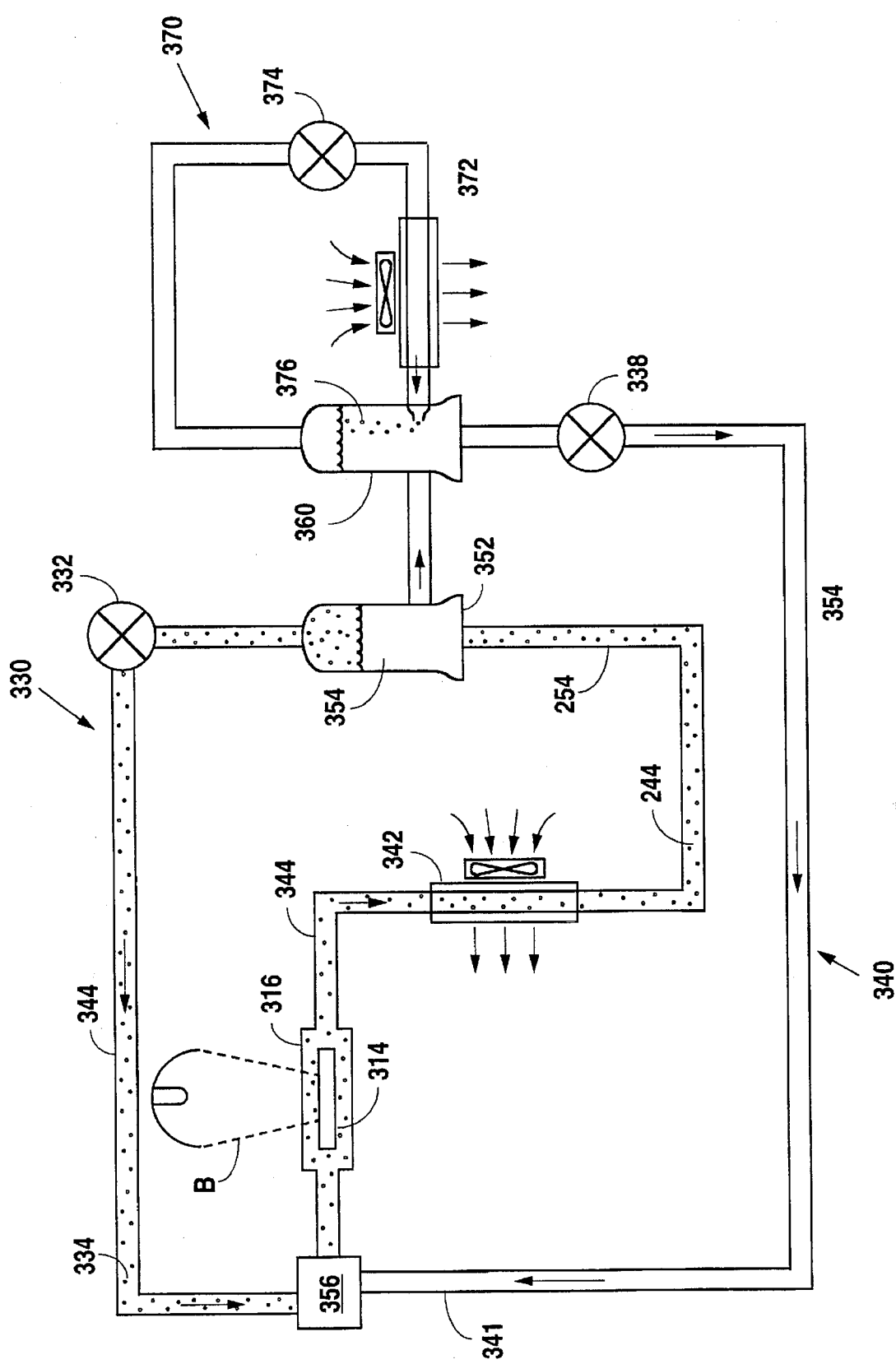
FIG. 7 is a diagrammatic view illustrating a still further embodiment of the present invention.

In another embodiment, the thermally protected environment in chamber 316, FIG. 7, includes an atmosphere of atomizer, heat conducting fluid. This is accomplished by an additional circuit 340 connected to circuit 330 and driven by a suitable low pressure liquid pump 338, a separation tower 352 containing a heat conducting fluid 354 such as water or alternatively, a fluorocarbon such as perfluorohexane ($C_6F_{14}$), and an aerosol generator 356.

The aerosol generator 356 receives the compressed heat conducting gas, i.e. Helium 334, from conduit 344 and also receives the heat conducting fluid 354 from conduit 341 of circuit 340. The heat conducting fluid 354 is nebulized, i.e. atomized in the aerosol generator 356 and combines with the Helium 334 in the generator 356. This combination is conducted to the cooling chamber 316 where it extracts heat from the image projection device 314. The heated combination is conducted via conduit 344 to a heat exchanger 342 where heat is removed. The cooled combination, i.e. Helium 334 and heat conducting fluid 354, is then conducted via conduit 344 to separation tower 352 where the heat conducting fluid 354 and Helium 334 separate, and the Helium 334 is compressed and returned to the generator 356 via compressor 332 and conduit 344. The heat conducting fluid 354 is conducted to a cooling tower 360 where additional cooling takes place. Cooling tower 360 is in an additional cooling circuit 370 which contains a heat exchanger 372, a compressor 374 and a hydrofluorocarbon (HFC) 376 such as a commercially available fluorine containing refrigerant designated R-404A, which is pumped through the cooling tower 360 to additionally cool the heat conducting fluid 354. The heat conducting fluid 354 is then pumped back to the aerosol generator 356 via pump 338 and the cycle is repeated. This additional cooling step lowers the temperature of the heat conducting fluid 354 below ambient to achieve better heat removal in the cooling chamber.

While this invention has been illustrated and described in accordance with a preferred embodiment, it is recognized that variations and changes may be made therein without departing from the invention as set forth in the claims.

Having described the invention, what is claimed is:

1. Apparatus for cooling a light beam, comprising:
   a) a light beam source that projects a light beam and heat;
   b) a gas cooling circuit containing a heat conducting gas;
   c) a cooling chamber which is integral to the gas cooling circuit and is placed in the light beam;
   d) an image projection device mounted in the cooling chamber;
   e) a cooling exchange tower integral to the gas cooling circuit;
   f) a liquid cooling circuit, of which the cooling exchange tower is an integral part, containing a liquid coolant;
   g) a driving device which moves the gas through the tower, whereby the gas, which absorbs heat in the cooling chamber, is cooled in response to being moved through the liquid coolant in the cooling exchange tower; and
   h) a pump device urging the liquid coolant to move through the liquid cooling circuit.

2. The apparatus as defined in claim 1, further comprising:
   a heat extracting dichroic filter mounted in the light beam adjacent the cooling chamber.

3. The apparatus as defined in claim 1, further comprising:
   a) a heat extracting fluid filter mounted in the light beam, the fluid filter including a glass dome housing adjacent the light beam source, the dome having a conduit formed therein connected for conducting liquid from the tower through the dome; and
   b) a pump for moving the liquid through the dome.

4. The apparatus as defined in claim 3, further comprising:

a dichroic coating on a surface of the dome adjacent the light beam source.

5. Apparatus for cooling a light beam, comprising:

a) a light beam source that projects a light beam and radiates heat;

b) a gas cooling circuit containing a heat conducting gas and having a driving device for moving the gas therethrough;

c) a cooling chamber which is integral to the gas cooling circuit and is placed in the light beam;

d) an image projection device mounted in the cooling chamber;

e) the gas being a heat conducting gas, the driving device being operable to move the heat conducting gas to circulate within the circuit;

f) a fluid cooling circuit, containing heat conducting fluid, connected to the gas circuit, the fluid circuit having a pump for moving fluid therethrough;

g) a separation tower integral to the gas and fluid circuits, the separation tower having a reservoir of heat conducting fluid therein; and h) an aerosol generator connected to the gas and fluid circuits, whereby the aerosol generator atomizes the heat conducting fluid, combines the atomized fluid with the heat conducting gas and moves the combined heat conducting gas and atomized fluid to the cooling chamber for extracting heat from the image projecting device.

6. Apparatus for cooling a light beam, comprising:

a) a light beam source that projects a light beam and radiates heat;

b) a gas cooling circuit filled with a heat conducting gas and having a driving device for moving the gas therethrough;

c) a cooling chamber which is integral to the gas cooling circuit and is placed in the light beam;

d) an image projection device mounted in the cooling chamber;

e) the gas being a heat conducting gas, the driving device being operable to move the heat conducting gas to circulate within the circuit:

f) a fluid circuit, containing a heat conducting fluid, connected to the gas circuit, the fluid circuit having a pump for moving fluid therethrough;

g) a secondary cooling circuit integral to the fluid circuit for cooling the fluid in the fluid circuit;

h) a separation tower connected to the gas and fluid circuits, the separation tower having a reservoir of heat conducting fluid therein; and i) an aerosol generator connected to the gas and fluid circuits, whereby the aerosol generator atomizes the heat conducting fluid, combines the atomized fluid with the heat conducting gas and moves the combined heat conducting gas and atomized fluid to the cooling chamber for extracting heat from the image projecting device.

* * * * *